United States Patent
Xu et al.

(10) Patent No.: US 9,904,953 B2
(45) Date of Patent: Feb. 27, 2018

(54) METHOD AND SYSTEM OF BUILDING STORE PRODUCT FINDERS

(75) Inventors: Jian Xu, Shanghai (CN); Qian Sun, ShangHai (CN); JinYu Lou, Shanghai (CN); Yi Zhou, Shanghai (CN); Xiaobo Wu, ShangHai (CN); Chaoou Huang, Shanghai (CN); Daniel Tsun Kao, San Jose, CA (US); Sonya Rongsheng Liang, Campbell, CA (US)

(73) Assignee: PAYPAL, INC., San Jose, CA (US)

( * ) Notice: Subject to any disclaimer, the term of this patent is extended or adjusted under 35 U.S.C. 154(b) by 1596 days.

(21) Appl. No.: 13/341,961

(22) Filed: Dec. 31, 2011

(65) Prior Publication Data

US 2012/0246028 A1    Sep. 27, 2012

Related U.S. Application Data

(63) Continuation of application No. 13/070,253, filed on Mar. 23, 2011, now abandoned.

(51) Int. Cl.
*G06Q 30/00* (2012.01)
*G06Q 30/06* (2012.01)

(52) U.S. Cl.
CPC ......... *G06Q 30/0641* (2013.01); *G06Q 30/06* (2013.01); *G06Q 30/0627* (2013.01)

(58) Field of Classification Search
CPC .................................. G06Q 30/0601–30/0645
USPC ............................................... 705/26.1–27.2
See application file for complete search history.

(56) References Cited

U.S. PATENT DOCUMENTS

| | | | |
|---|---|---|---|
| 6,366,890 B1 * | 4/2002 | Usrey | 705/7.31 |
| 7,272,618 B1 * | 9/2007 | Bisotti et al. | |
| 7,386,562 B2 * | 6/2008 | Long | 707/694 |
| 7,457,772 B2 * | 11/2008 | Tabin | 705/26.64 |
| 7,836,077 B2 * | 11/2010 | Azvine et al. | 707/771 |
| 7,974,879 B2 * | 7/2011 | Chu et al. | 705/14.69 |
| 8,051,059 B2 * | 11/2011 | Meiresonne | 707/705 |
| 8,122,020 B1 * | 2/2012 | Donsbach et al. | 707/732 |
| 2005/0246332 A1 * | 11/2005 | Wang et al. | 707/3 |
| 2007/0156678 A1 * | 7/2007 | Ashkenazi et al. | 707/5 |
| 2008/0262900 A1 * | 10/2008 | Duffy et al. | 705/10 |
| 2010/0082410 A1 * | 4/2010 | Baudin et al. | 705/10 |
| 2010/0114908 A1 * | 5/2010 | Chand et al. | 707/748 |

(Continued)

OTHER PUBLICATIONS

Peerless industries launches redesigned website with most advanced product search engine tool. (Jun. 8, 2005). Business Wire Retrieved from https://dialog.proquest.com/professional/docview/673633951?accountid=142257.*

(Continued)

*Primary Examiner* — Resha Desai
(74) *Attorney, Agent, or Firm* — Maschoff Brennan

(57) ABSTRACT

One embodiment provides a system for building store product finders. The system may include: a product search engine to find products matching at least one product subcategory of product subcategories of a store product category for a store product finder, and a dominant product subcategory determining device to determine a dominant product subcategory. Each product subcategory has a product coverage. The dominant product subcategory has a highest product coverage among the product subcategories. The system may also include a filter installing device to install at least one product search filter into the store product finder.

17 Claims, 5 Drawing Sheets

(56) References Cited

U.S. PATENT DOCUMENTS

2010/0179860 A1\* 7/2010 Noel et al. .................... 705/10
2011/0252042 A1\* 10/2011 Wu et al. ...................... 707/748
2012/0036085 A1\* 2/2012 Srivastava et al. ........... 705/348
2012/0191719 A1\* 7/2012 Musgrove et al. ........... 707/740

OTHER PUBLICATIONS

"U.S. Appl. No. 13/070,253, Non Final Office Action dated Mar. 30, 2012", 10 pgs.

\* cited by examiner

METHOD AND SYSTEM OF BUILDING STORE PRODUCT FINDERS

CROSS-REFERENCE TO RELATED APPLICATIONS

This application is a continuation of U.S. application Ser. No. 13/070,253, filed on Mar. 23, 2011 now abandoned and entitled "METHOD AND SYSTEM OF BUILDING STORE PRODUCT FINDERS," which application is hereby incorporated herein by reference in its entirety.

TECHNICAL FIELD

The present application relates generally to information processing and particularly, but not by way of limitation, to systems and methods for building store product finders over a network.

BACKGROUND

With the development of computer and network related technologies, more users (e.g., sellers and buyers) participate electronic commerce (e-commerce) activities or events. For example, sellers or buyers may attempt to sell or purchase products (or items) via networks (e.g., the Internet). In many situations, sellers however may not provide buyers with efficient or convenient approaches to find products that meet the demands or interests of the buyers.

BRIEF DESCRIPTION OF THE DRAWINGS

Some embodiments are illustrated by way of examples and not limitation in the figures of the accompanying drawings in which.

DETAILED DESCRIPTION

Example methods and systems to build store product finders via a network are described. In the following description, for purposes of explanation, numerous specific details are set forth in order to provide a thorough understanding of example embodiments. It will be evident, however, to one skilled in the art that the present application may be practiced without these specific details.

In Consumer-to-consumer (C2C) e-commerce sites (like eBay®), sellers may run their own on-line stores to sell their products or items. However, it could be time consuming for buyers to search in the on-line stores to find the products that meet their interests or needs. In some embodiments, a store product finder building system may be used by sellers to build store product finders, which offer the buyers the ability to find products (or items) that meet the demands or interests of the buyers based on product aspects or characteristics. For example, the store product finder building system may facilitate sellers who specialize in selling a variety of products (e.g., shoes etc) to build store product finders, which enable buyers to search in the on-line store to find specific products (e.g., men's running shoes) based on product aspects (e.g., shoes sizes, shoes colors, and shoes brands etc) that the buyers want.

Platform Architecture

Figure 1:
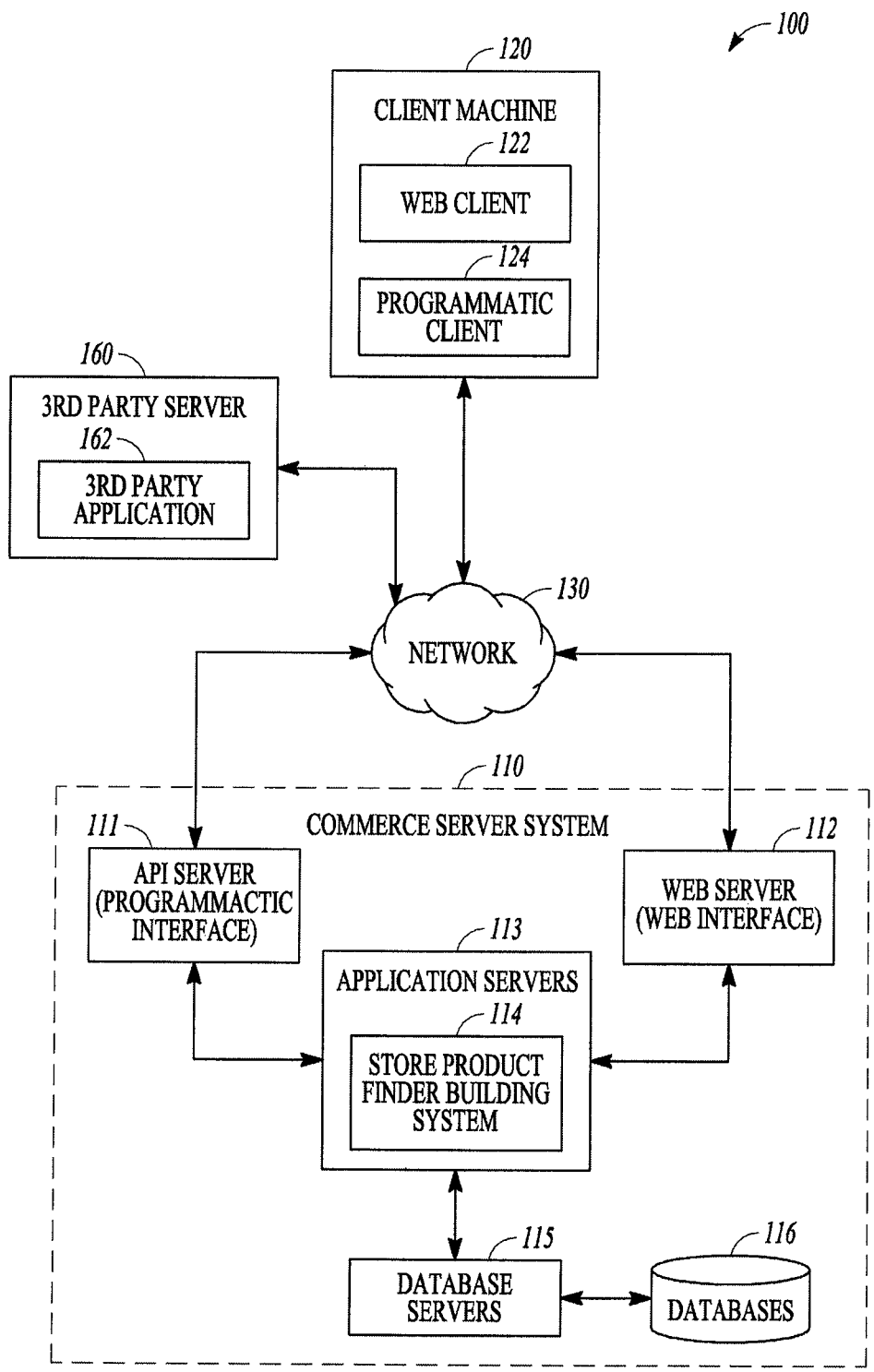
FIG. 1 is a network diagram illustrating an e-commerce shopping system that has client-server architecture in accordance with an embodiment.

FIG. 1 is a network diagram depicting an e-commerce shopping system 100 having a client-server architecture in accordance with an embodiment. The e-commerce shopping system 100 may include a commerce server system 110 and one or more client machines (e.g., a PC computer) 120, which are inter-connected via a network (e.g., the Internet) 130.

The network-based commerce server system 110, provides server-side functionality, via a network 130 (e.g., the Internet or Wide Area Network (WAN)) to the one or more client machines 120. An Application Program Interface (API) server 111 and a web server 112 are coupled to, and provide programmatic and web interfaces respectively to, at least one application server 113.

Figure 2:
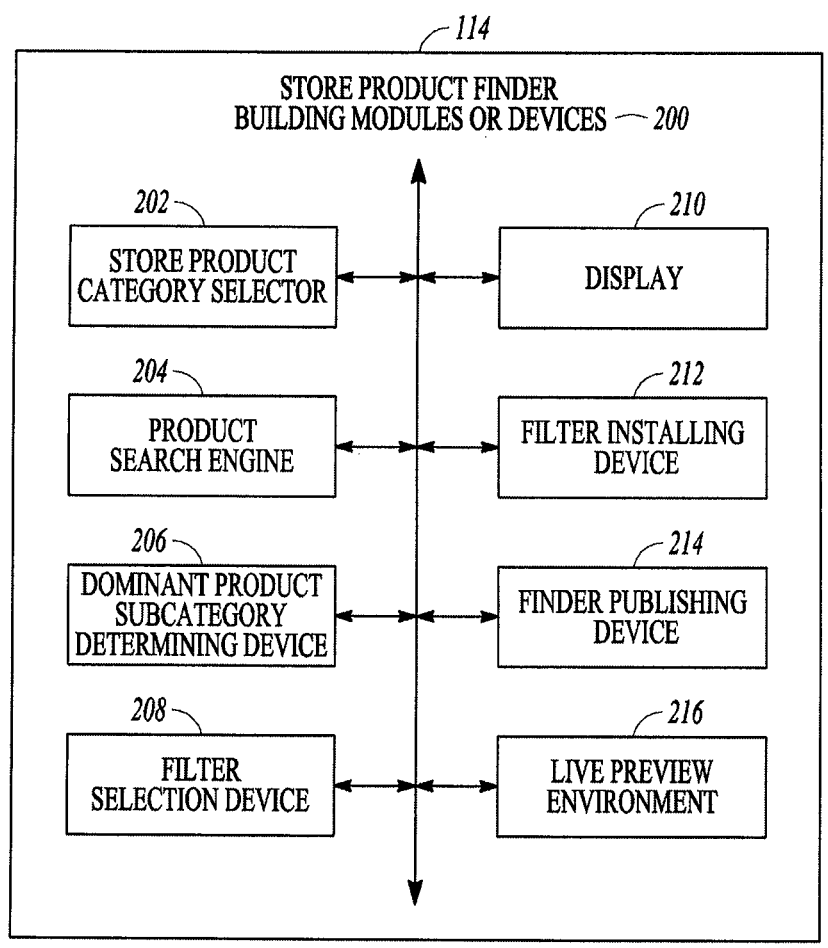
FIG. 2 is a block diagram illustrating multiple store product finder building modules or devices in accordance with an embodiment.

The application server 113 may include at least a store product finder building system 114, which may include multiple store product finder building modules or devices 200 as shown in FIG. 2. The store product finder building system 114 may facilitate sellers to build or create store product finders. Buyers may use the built store product finders created by the sellers using embodiments of the application to find products that meet their demands or interests. The application server 113 is, as shown, coupled to one or more database servers 115 that facilitate access to one or more databases 116.

A seller or a buyer may access one of the client machines 120, and then may interact with the commerce server system 110 via the network 130. Either or both a web client 122 (e.g., a browser), and a programmatic client 124 may execute on a respective client machine 120 for example. The web client 122 may access the store product finder building system 114 via a web interface supported by the web server 112 for example. Similarly, the programmatic client 124 may access the various services and functions provided by the store product finder building system 114 via a programmatic interface provided by the API server 111 for example.

FIG. 1 also illustrates a third party application 162, executing on a third party server machine 160, as having programmatic access to the networked commerce server 110 via the programmatic interface provided by the API server 111. The third party application 162 may utilize information retrieved from the networked commerce server system 110 and support features or functions on a website hosted by the third party. The third party server machine 160 may provide e-commerce shopping functions or services that are supported by the relevant applications and/or devices of the networked commerce server system 110. The third party server machine 160 may also provide data resources, which may be provided to and utilized by certain modules (or devices) in the store product finder building system 114.

While the store product finder building system 114 in FIG. 1 forms part of the networked commerce server system 110, it will be appreciated that, in alternative embodiments, the store product finder building system 114 may form part of an e-commerce shopping service that is separate and distinct from the networked system.

While the e-commerce shopping system 100 shown in FIG. 1 employs client-server architecture, the present application is not limited to such architecture, and could equally well find application in a distributed, multi-tiered or a peer-to-peer architecture system for example. The store product finder building system 114 could also be implemented as standalone software programs, hardware or devices, which do not necessarily have networking capabilities.

Store Product Finder Building System

FIG. 2 is a block diagram illustrating multiple store product finder building modules or devices 200 of the store product finder building system 114 in accordance with one example embodiment. The store product finder building modules or devices 200 may facilitate sellers to build store product finders, which may be defined using data structures that are stored in a storage, to offer buyers the ability to find products based on product aspects or characteristics for example.

Figure 3:
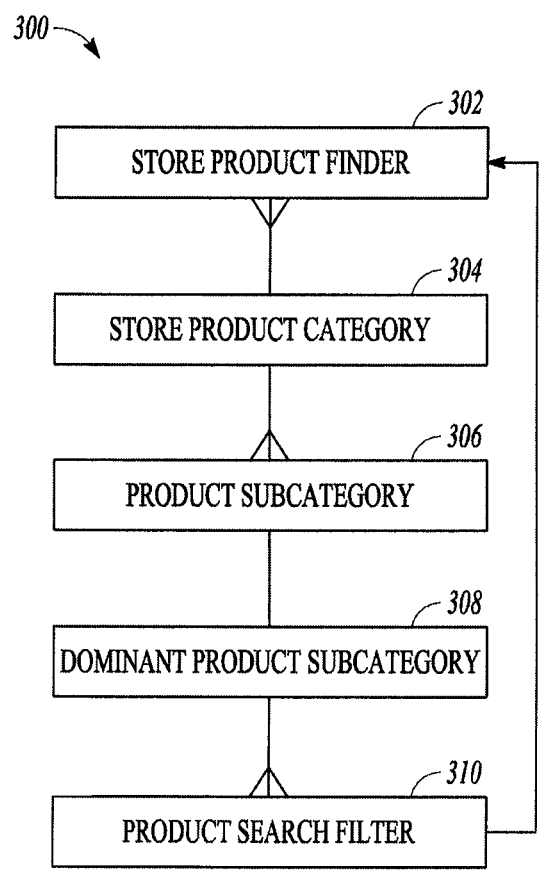
FIG. 3 is a high level entity-relationship diagram illustrating various tables maintained in a database in accordance with an embodiment.

In some embodiments, the store product finders may be saved in a store product finder storage (e.g., a "store product finder" table 302 as shown in FIG. 3), which may be a database inside or outside of the store product finder building system 114. A name or title (e.g., "men's shoes finder") may be assigned to the store product finder either in the store product finder building process or when the building process is finished.

In some embodiments, the store product finder building modules or devices 200 of the store product finder building system 114 may include, but are not limited to, a store product category selector 202, a product search engine 204, a dominant product subcategory determining device 206, a filter selection device 208, a display 210, a product finder installing device 212, a product finder publishing device 214, and a live preview environment 216.

In some embodiments, the store product category selector 202 may provide an interface for selecting a store product category (e.g., "men's shoes category") from a list of store product categories (e.g., "men's shoes category" and "women's shoes category") that are stored in a store product category storage (e.g., a "store product category" table 304 as shown in FIG. 3).

In some embodiments, the product search engine 204 may search a product storage (e.g., a "product" table 306, as shown in FIG. 3) to retrieve a list of product subcategories within the selected store product category. The list of product subcategories may be stored in the product storage. Each retrieved product subcategory may have a product coverage that in some embodiments is defined as (a sum of product items within the product subcategory)/(a sum of entire product items within the selected store product category). For example, a product category (e.g., "shoes") includes product subcategories, e.g., a product subcategory A (e.g., "women shoes"), a product subcategory B (e.g., "men shoes") and etc. The product category ("shoes") includes 5 product items, for example, Item #1 "Nike women basketball shoes 10001", Item #2 "Nike women tennis shoes 10002", Item #3 "Nike women running shoes 10003", Item #4 "Adidas men running shoes 10004", and Item #5 "shoes laces 10005". Therefore, 3 product items (Item #1, Item #2 and Item #3) of the product category ("shoes") belong to and are thus mapped to the product subcategory A ("women's shoes"), and 1 product item (Item #4) belong to and is thus mapped to the product subcategory B ("men shoes"). In this case, the product subcategory A ("women shoes") has a product coverage as (3/5=60%), and the product subcategory B ("men shoes") has a product coverage as (1/5=20%).

Further in some embodiments the product coverage may be determined as a weighted sum of various factors. For example, product coverage may be determined as:

$$\text{Product Coverage} = \text{Product Score}/\text{Total Product Score}$$

where:
Product Score=Item Count Mapped to product*ItemCountWeight+ItemDemand Mapped to product*ItemDemandWeight Total Product Score=Item Count Mapped to all products*ItemCountWeight+ItemDemand Mapped to all products*ItemDemandWeight Item Count means the number of items maps to the product.

Item Count Weight and Item demand weight is the weight value for the corresponding factors. In some embodiments, the value of the weight ranges from 0-1, and the sum of the various weights is 1.

The above factors include demand components. By choosing a non-zero item demand weight, item demand factors can be included in the product coverage calculation. Thus the product coverage can include item demand information in order to increase sales. Item demand can be determined in various ways. For example, in some embodiments, the item demand components may be defined as follows:

$$\text{Item Demand} = \text{Normalized Recent Sales}*\text{Weight1} + \text{Normalized Item Watch Count}*\text{Weight2} + \text{Normalized Product Saved Count}*\text{Weight3}$$

where:
Normalized Recent Sales is the value (ranges from 0-1) to reflect recent sales status in a certain period (for e.g. in the past 1 week). For example, 1 means sold most recently. While 0.1 means sold few recently.

Normalized Item Watch Count: the items' watched count—the number of page views of this item. The value may be normalized to 0-1. 1 means most watched item. A small value means less watched item.

Normalized Product Saved Count: (ranges from 0-1) to reflect the popularity of a product by calculating how many people saved this product (i.e. add this product to their favorite products, which is an existing functionality provided by eBay and other online merchants like Amazon).

The exact decision of various weights may be done via business performance analysis. In some embodiments, the sum of the weights may be normalized such that the sum of weights is 1.

The following examples illustrate the above concepts.

Example 1 (Product Coverage Based Purely on Item Count)

ItemCountWeight=1
ItemDemandWeight=0

| Item Detail | Item Count | Mapped Product |
|---|---|---|
| Item#1 Man basketball shoes | 1 | Men's Shoes |

-continued

|  | Item Detail | Item Count | Mapped Product |
|---|---|---|---|
| Item#2 | Man tennis shoes | 1 | Men's Shoes |
| Item#3 | Man football shoes | 1 | Men's Shoes |
| Item#4 | Adidas Women running shoes | 1 | Women's Shoes |
| Item#5 | Adidas Women clothes | 1 | Women's Clothes |
| Total |  | 5 |  |

Product Coverage

|  | Product Score | Product Coverage |
|---|---|---|
| Men's Shoes | 3 * 1 | 60% |
| Women's Shoes | 1 * 1 | 20% |
| Women's Clothes | 1 * 1 | 20% |
| Total Product Score | 3 * 1 + 1 * 1 + 1 * 1 = 5 |  |

Example 2 (Product Coverage Based on Item Count and Item Demand)

This example illustrates a non-zero item demand weight and adds item demand factors into product coverage calculation. Thus the product coverage can include item demand info in order to increase sales. For the purposes of this example, Item Count weight has been chosen as 0.5 and Item Demand weight as 0.5. This choice of weight takes both factors equally. As noted above, the weights may vary from this example; the exact decision of various weights is normally done via business performance analysis.

|  | Item Detail | Item Count | Mapped Product |
|---|---|---|---|
| Item#1 | Man basketball shoes | 1 | Men's Shoes |
| Item#2 | Man tennis shoes | 1 | Men's Shoes |
| Item#3 | Man football shoes | 1 | Men's Shoes |
| Item#4 | Adidas Women running shoes | 1 | Women's Shoes |
| Item#5 | Adidas Women clothes | 1 | Women's Clothes |
| Total |  | 5, |  | in this example Item demand weight1 = 0.25, Weight2 = 0.25, weight3 = 0.5.

This means that the Normalized product saved count is given more weight. Again, the actual weight may be determined by business performance analysis. The weights used here are for illustration purpose.

|  | Normalized Recent Sales | Normalized Item Watch Count | Normalized Product Saved Count | Weighted Item Demand Score |
|---|---|---|---|---|
| Item#1 | 1 | 1 | 0.8 | 0.9 |
| Item#2 | 1 | 1 | 0.8 | 0.9 |
| Item#3 | 0.5 | 0.6 | 0.2 | 0.375 |
| Item#4 | 0.5 | 0.6 | 0.1 | 0.325 |
| Item#5 | 0.1 | 0.2 | 0.1 | 0.125 |
| Total |  |  |  | 2.625 |

Product Coverage

|  | Product Score | Product Coverage |
|---|---|---|
| Men's Shoes | 3 * 1 + 0.9 + 0.9 + 0.375 = 5.175 | 53.8% |
| Women's Shoes | 1 * 1 + 0.325 = 2.325 | 24.2% |
| Women's Clothes | 1 * 1 + 0.125 = 2.125 | 22.0% |
| Total Product Score | 9.625 | 100% |

Those of skill in the art having the benefit of the disclosure will appreciate that alternative formulations for product coverage may be used and are within the scope of the inventive subject matter. For example, a formula based on value or price of subcategories and the product category could be used. As an example, a Normalized Item Price may be a normalized price score (0-1) for an item. The higher score means the item has a lower price.

In some embodiments, the dominant product subcategory determining device 206 may determine a dominant (or winning) product subcategory that has the highest product coverage among product subcategories within the store product category. Each dominant product subcategory may be stored in a dominant product subcategory storage (e.g., a "dominant product subcategory" table 308 as shown in FIG. 3).

In some embodiments, a display 208 (e.g., a computer monitor) may present a list of product search filters that have been predefined (or built) for the determined dominant product.

In some embodiments, a filter selection device 210 may provide an interface allowing a user (e.g., a seller of the on-line store) to select one or more product search filters from the list of product search filters. The selected product search filters may be stored in a product filter storage (e.g., a "product search filter" table 310 as shown in FIG. 3).

In some embodiments, a product filter installing device 212 may install the selected product search filters into a store product finder. The selected product search filters are thus associated or linked to the store product finder, so as to facilitate buyers to search and find products that meet their requirements or demands based on the product aspects or characteristics.

In some embodiments, a product finder publishing device 214 may publish the built store product finders into production. The publishing may move the store product finders from a live preview environment to a production environment so that buyers may see the store product finders. In some embodiments, in a live preview environment 216 (e.g., an interface displayed on a display device), a seller of the on-line store may design the built store product finder. Before publishing, only store owners may see the store product finders in the live preview environment. For example, the seller may select a layout of the store product finder in the live preview environment 216. The seller may also select a placement of the store product finder in the live preview environment 216. In the live preview environment 216, a seller may also input custom cascading style sheet (CSS) content to customize the built store product finder for example.

In some embodiments, the store product finder building modules or devices 200 may be hosted on a dedicated server machine or on shared server machines that are communicatively coupled to enable communications between these server machines.

In some embodiments, the store product finder building modules or devices 200 themselves are communicatively coupled (e.g., via appropriate interfaces) to each other and to various data sources, so as to allow information to be passed between these modules or devices or so as to allow these modules or devices to share and access common data.

In some embodiments, the store product finder building modules or devices 200 may be coupled to a bus, network or shared memory for example and thus may communicate with each other. These store product finder building modules or devices 200 may furthermore obtain access to one or more databases 116 via the database server 115 (as shown in FIG. 1).

In some embodiments, the store product finder building modules (or devices) 200 may be implemented in software, hardware, or as a combination of software and hardware. These multiple modules or devices 200 may provide a number of functions and/or services to users (e.g., sellers or buyers) of the network-based commerce server system 110.

Data Structures

FIG. 3 is a high-level entity-relationship diagram, illustrating various tables 300 that may be maintained within the databases 116 as shown in FIG. 1, and that support and are utilized by the multiple store product finder building modules or devices 200 as shown in FIG. 2. The various tables 300 may include, but are not limited to, a "store product finder" table 302, a "store product category" table 304, a "product" table 306, a "dominant product" table 308, and a "product search filter" table 310.

Each "store product finder" table 302 may contain records for each store product finder, which has been built by a seller of an on-line product store to offer buyers with the ability to search and find products based on product aspects or characteristics for example. Each "store product finder" table 302 may include fields, but not limited to, a store product finder identifier, a store product finder name, and a store product category identifier of a store product category that is associated with the store product finder.

Each "store product category" table 304 may contain records for each store product category that is associated with one or more store product finders for example. Each "store product category" table 304 may include fields, but not limited to, a store product category identifier, and a store product category name.

Each "product subcategory" table 306 may contain records for each product subcategory offered to sell by the online product store for example. Each "product subcategory" table 306 may include fields, but not limited to, a product subcategory identifier, a product subcategory name, and a product category identifier of a product category to which the product subcategory belongs.

Each "dominant product subcategory" table 308 may contain records for each dominant product subcategory offered to sell by the online product store for example. Each "dominant product subcategory" table 308 may include fields, but not limited to, a dominant product subcategory identifier, a dominant product subcategory name, and a store product category identifier of a store product category to which the dominant product subcategory belongs.

Each "product search filter" table 310 may contain records for each product search filter, which has been predefined for the dominant product subcategory. Each "product search filter" table 310 may include fields, but not limited to, a product filter identifier, a product filter name, a dominant product subcategory identifier, and a store product finder identifier to which the product search filter is linked. For example, a user (e.g., a seller of the online store) may select one or more product search filters to be linked or associated with a particular store product finder.

Methods of Building Store Product Finders

Figure 4:
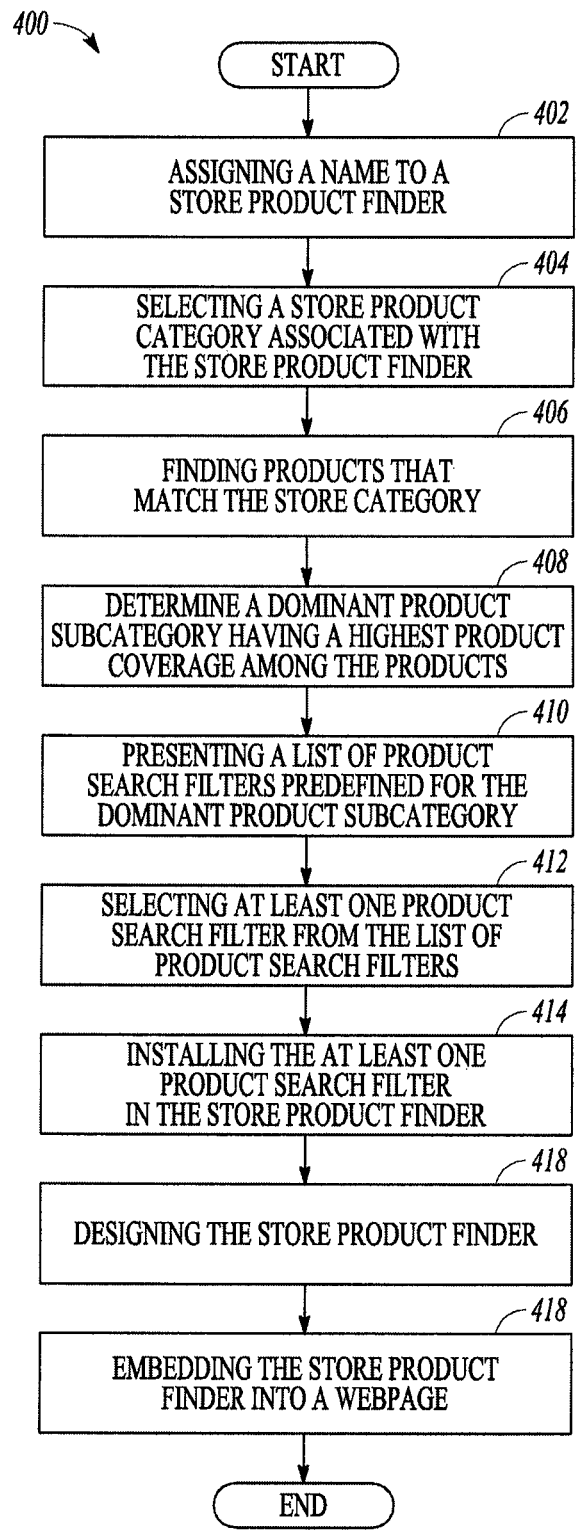
FIG. 4 is a flowchart illustrating a method of building store product finders via a network in accordance with an embodiment.

FIG. 4 is a flowchart illustrating a method 400 of building store product finders via a network in accordance with an embodiment of the present application.

At operation 402, a name or title (e.g., "men's shoes finder") may be assigned to a store product finder, which may be saved in a store product finder storage (e.g., a "store product finder" table 302 as shown in FIG. 3).

At operation 404, a store product category selector 202 may select a store product category (e.g., "shoes category") from a list of store product categories (e.g., "shoes category" and "clothes category"), which may be stored in a store product category storage (e.g., a "store product category" table 304 as shown in FIG. 3). Store product categories may be maintained by store owners. The selection may be received through a user interface or it may be received through programmatically through an application program interface.

At operation 406, a product search engine 204 may find a plurality of product subcategories (e.g., "men shoes", and "women shoes", etc) that belongs to or matches the selected store product category (e.g., "shoes category"). The search may be based on the selection of the store product category by a user (e.g., a seller or a buyer).

At operation 408, a dominant product subcategory determining device 206 may determine a dominant product subcategory, which is defined as a product subcategory that has the highest product coverage among the plurality of product subcategories (e.g., "men shoes", "women shoes", etc). The product coverage of a product subcategory is defined as (a sum of product items within the product subcategory)/(a sum of product items within the selected store product category).

For example, if the "women shoes" product subcategory has 60% product coverage, the "men shoes" product subcategory has 20% product coverage, and the rest of the products in the category have 20% product coverage, the "women shoes" product subcategory is determined as the dominant or wining product subcategory to be associated with the selected store product category (e.g., "shoes category").

At operation 410, a display 208 may present a list of product search filters, which have been predefined for the dominant product subcategory and have been saved in a product search filter storage (e.g., a product search filter table 310 as shown in FIG. 3). For example, each dominant product subcategory (e.g., "women shoes") may have product search filters (e.g., "size (6, 8, 10)", "color (white, black, red)", "brand" etc) that have been predefined for the dominant product subcategory.

At operation 412, a filter selection device 210 may facilitate a user (e.g., a seller of the online store) to select one or more product search filters from the list of product search filters. For example, the seller of the online store may select, from the list of product search filters, one or more product search filters (e.g., "size (6, 8, 10)" and "color (white, black, red)") as the product search filters to be linked to the store product finder (e.g., "women shoes finder").

At operation 414, a product filter installing device 210 may install the selected product search filters (e.g., "size (6, 8, 10)" and "color (white, black, red)") into the store product finder (e.g., "women's shoes finder"). In some embodiments, the selected product search filters may be installed into the store product finder by linking the filters to the store product finder.

In some embodiments, a store product finder publishing device 212 may publish the built store product finder into production to make it available for the public to use.

An example situation illustrating the use of the store finder is as follows. A buyer may visit an e-commerce store with store product finders created using the systems and methods described above. When the buyer clicks a store product category (e.g., "men's shoes category"), one or more built store product finders (e.g., "men's shoes finder") may appear on a webpage of the online store. Then, the buyer may select one or more product search filters (e.g., "size (6, 8, 10)" and "color (white, black, red)") to search for the products (e.g., men's shoes) that meets his/her interests or demands based on the product aspects or characteristics (e.g., the size and the color).

At operation 416, the built store product finder may be designed in a live preview environment 216 as shown in FIG. 2. A user (e.g., a seller or buyer of the online store) may select a layout and/or a placement of the store product finder. For example, the user may input custom cascading style sheet (CSS) content to customize the store product finder.

At operation 418, the store product finder may be embedded into a webpage by for example an asynchronous JavaScript call. In some embodiments, the JavaScript call may be sent by appending a JavaScript tag to a source code file of the webpage. In some embodiments, a URL of the JavaScript call may include an identification of the store product finder. A response to the JavaScript call may include customization information. In some embodiments, the store product finders may be embedded into the webpage based on the customization information.

An Example Computer System

Figure 5:
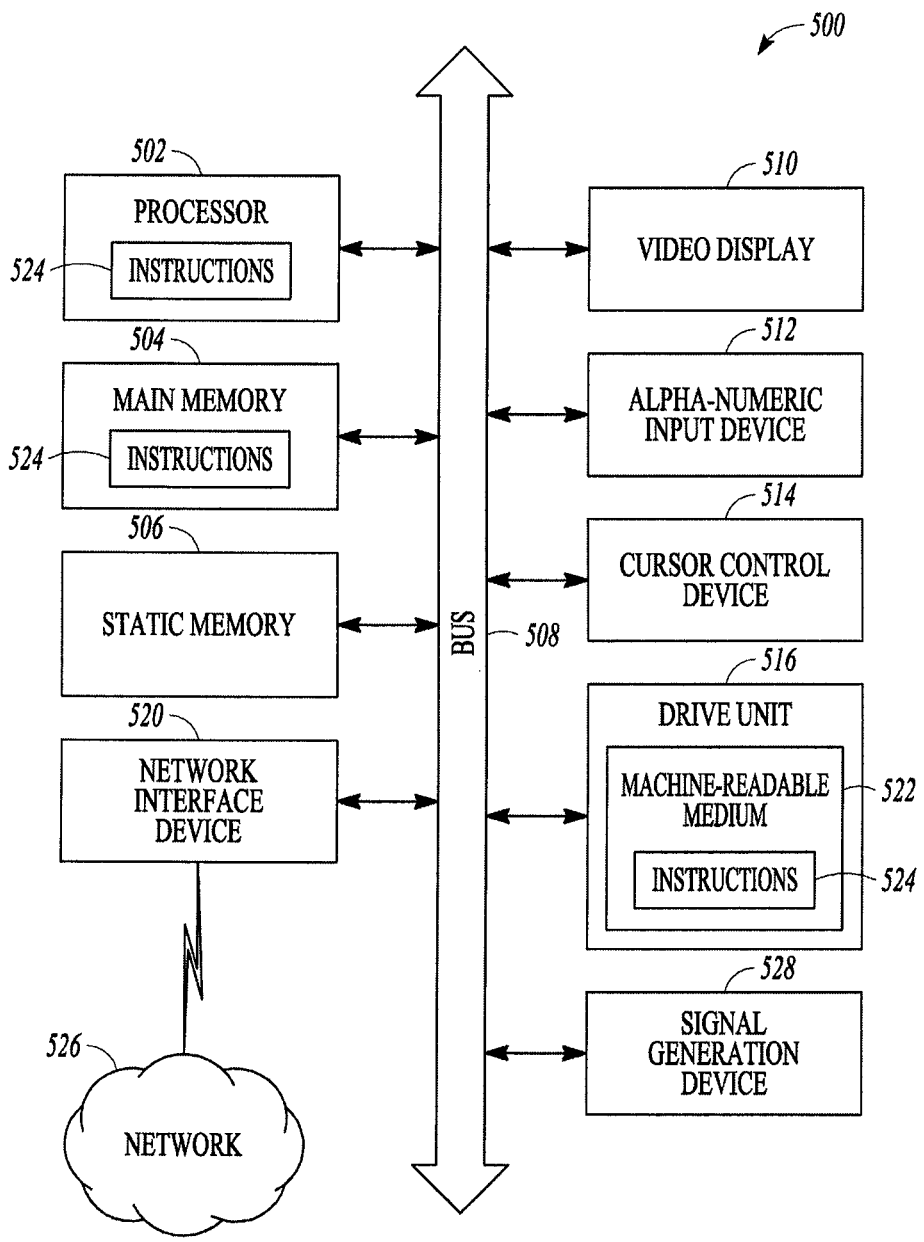
FIG. 5 is a block diagram illustrating a machine in the example form of a computer system, within which a set of sequence of instructions for causing the machine to perform any one of the methodologies discussed herein may be executed.

FIG. 5 is a block diagram illustrating a machine in the example form of a computer system 500, within which a set of sequence of instructions for causing the machine to perform any one of the methodologies discussed herein may be executed. In alternative embodiments, the machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520. While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, methods and systems for providing e-commerce shopping guidance to a customer via networks have been described. Although the present application has been described with reference to specific embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method, comprising:
   using one or more processors coupled to a memory to perform one or more of the following:
   retrieving products matching a store product category including product subcategories for a store product finder embedded within a webpage, each product subcategory having a product coverage, each product matching at least one product subcategory of the product subcategories;
   determining a product subcategory as a dominant product subcategory from the product subcategories by using the one or more processors, the dominant product subcategory having a highest product coverage among the product subcategories, wherein a product coverage of a candidate product subcategory is a ratio of a sum of weighted supplied products and weighted demanded products within the candidate product subcategory to a sum of weighted supplied products and weighted demanded products within the store product category; and
   installing into the store product finder at least one product search filter selected from a list of product search filters predefined for the dominant product subcategory.

2. The method of claim 1, further comprising receiving a selection of the store product category associated with the store product finder.

3. The method of claim 1, further comprising presenting a list of product search filters predefined tier the dominant product subcategory.

4. The method of claim 1, further comprising designing the store product finder in a live preview environment.

5. The method of claim 4, wherein the designing the store product finder comprises:
   receiving a selection of a layout of the store product finder;
   receiving a selection of a placement of the store product finder; and
   receiving a custom cascading style sheet content to customize the store product finder.

6. The method of claim 1, further comprising saving the store product finder in a store product finder storage.

7. The method of claim 1, further comprising publishing, using a publishing device, the store product finder into production.

8. The method of claim 1, further comprising embedding the store product finder into the webpage by an asynchronous JavaScript call that is sent via appending a JavaScript tag to a source code file of the webpage, wherein a URL of the JavaScript call includes an identification of the store product finder, wherein a response to the JavaScript call includes a customization information, and wherein the store product finder is embedded into the webpage based on the customization information.

9. A system, comprising:
   one or more processors coupled to a memory;
   a product search engine to find products matching at least one product subcategory of product subcategories of a store product category for a store product finder rendered on a webpage, each product subcategory having a product coverage;
   a dominant product subcategory determining device to determine a product subcategory from the product subcategories as a dominant product subcategory by using the one or more processors, the dominant product subcategory having a highest product coverage among the product subcategories, wherein a product coverage of a candidate product subcategory is a ratio of a sum of weighted supplied products and weighted demanded products within the candidate product subcategory to a sum of weighted supplied products and weighted demanded products within the store product category; and
   a filter installing device to install at least one product search filter into the store product finder.

10. The system of claim 9, further comprising:
    a store product finder storage to store a plurality of store product finders, each store product finder being associated with a store product category.

11. The system of claim 9, further comprising:
    a filter selection device to select the at least one product search filter from a list of product search filters predefined for the dominant product subcategory.

12. The system of claim 9, further comprising:
    a store product category storage to save the plurality of store product categories; and
    a dominant product subcategory storage to save the store dominant product subcategory.

13. The system of claim 9, further comprising:
    a display to present the list of product search filters predefined for the dominant product subcategory; and
    a finder publishing device configured to publish the store product finder into production.

14. The system of claim 9, further comprising a live preview environment adapted to design the store product finder by receiving a selection of a layout of the store product finder, receiving a selection of a placement of the store product finder, and receiving input of a custom cascading style sheet (CSS) content to customize the store product finder.

15. A non-transitory machine-readable storage medium comprising instructions that, when executed by one or more processors of a machine, cause the machine to perform a method comprising:
    retrieving products matching a store product category including product subcategories for a store product finder rendered on a webpage, each product subcategory having a product coverage, each product matching at least one product subcategory of the product subcategories;
    determining a product subcategory as a dominant product subcategory from the product subcategories, the dominant product subcategory having a highest product coverage among the product subcategories, wherein a product coverage of a candidate product subcategory is a ratio of a sum of weighted supplied products and weighted demanded products within the candidate product subcategory to a sum of weighted supplied products and weighted demanded products within the store product category; and
    installing into the store product finder at least one product search filter selected from a list of product search filters predefined for the dominant product subcategory.

16. The non-transitory machine-readable storage medium of claim 15, wherein the method further comprises assigning a title to the store product finder.

17. The non-transitory machine-readable storage medium of claim 15, wherein the method further comprises:
    receiving a selection of the store product category associated with the store product finder; and
    presenting by a display a list of product search filters predefined for the dominant product subcategory.

\* \* \* \* \*